US011126201B2

(12) United States Patent
Rozenberg et al.

(10) Patent No.: US 11,126,201 B2
(45) Date of Patent: Sep. 21, 2021

(54) IMAGE SENSOR BASED AUTONOMOUS LANDING

(71) Applicant: ISRAEL AEROSPACE INDUSTRIES LTD., Lod (IL)

(72) Inventors: Ohad Rozenberg, Yad Binyamin (IL); Haim Somech, Yavne (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 212 days.

(21) Appl. No.: 16/334,418

(22) PCT Filed: Dec. 18, 2017

(86) PCT No.: PCT/IL2017/051357
§ 371 (c)(1),
(2) Date: Mar. 19, 2019

(87) PCT Pub. No.: WO2018/122836
PCT Pub. Date: Jul. 5, 2018

(65) Prior Publication Data
US 2019/0235523 A1    Aug. 1, 2019

(30) Foreign Application Priority Data

Dec. 29, 2016 (IL) .......................................... 249870

(51) Int. Cl.
*G05D 1/04* (2006.01)
*B64D 47/08* (2006.01)
(Continued)

(52) U.S. Cl.
CPC ........... *G05D 1/042* (2013.01); *B64C 39/024* (2013.01); *B64D 47/08* (2013.01);
(Continued)

(58) Field of Classification Search
CPC ............................. G05D 1/042; B64C 39/024; B64C 2201/141; B64C 2201/187; B64D 47/08; G06K 9/00624
See application file for complete search history.

(56) References Cited

U.S. PATENT DOCUMENTS

| 5,716,032 A | 2/1998 | Mcingvale |
| 6,952,632 B2 | 10/2005 | Robert et al. |

(Continued)

FOREIGN PATENT DOCUMENTS

| CN | 101109640 A | 1/2008 |
| CN | 101504287 A | 8/2009 |
| WO | 2014169354 A1 | 10/2014 |

OTHER PUBLICATIONS

Miller, A et al., "Landing a UAV on a Runway Using Image Registration", In Robotics and Automation, 2008. ICRA 2008. IEEE International Conference on (pp. 182-187). IEEE,, University of Central Florida, May 2008, 6 pages.

*Primary Examiner* — Peter D Nolan
*Assistant Examiner* — Wae L Louie
(74) *Attorney, Agent, or Firm* — Dorsey & Whitney LLP (57) ABSTRACT

A computer-implemented method of controlling an aircraft during autonomous landing. The method includes using a computer for performing the following: applying image processing on an image captured by a camera on board the aircraft while approaching a runway for identifying in the image a touchdown point (TDP) of the runway; calculating a deviation, in image parameters, of the TDP relative to the center of the image; converting the deviation in image parameters to angular and distance deviation values based on predefined ratios; calculating an offset of the aircraft's position relative to a landing corridor ending at the identified TDP based on the calculated angular and distance deviation; and transmitting the calculated offset to an aircraft control (Continued)

system configured to provide instructions for controlling the aircraft; wherein the offset is used for controlling the aircraft for guiding the aircraft towards the landing corridor to enable landing.

21 Claims, 6 Drawing Sheets

(51) Int. Cl.
  *G06K 9/00* (2006.01)
  *B64C 39/02* (2006.01)
(52) U.S. Cl.
  CPC .... *G06K 9/00624* (2013.01); *B64C 2201/141* (2013.01); *B64C 2201/187* (2013.01)

(56) References Cited

U.S. PATENT DOCUMENTS

| | | |
|---|---|---|
| 9,260,180 B2 | 2/2016 | Puyou et al. |
| 10,800,548 B2 * | 10/2020 | Wang ................. B64F 1/222 |
| 10,877,365 B2 * | 12/2020 | Rozenberg ......... H04N 5/23299 |
| 2009/0306840 A1 | 12/2009 | Blenkhorn et al. |
| 2011/0015810 A1 | 1/2011 | Lee |
| 2014/0249703 A1 | 9/2014 | He |
| 2015/0314885 A1 * | 11/2015 | Zhang ................. G06T 7/70 348/117 |
| 2016/0026189 A1 | 1/2016 | Boada-bauxell et al. |
| 2017/0075351 A1 * | 3/2017 | Liu .................... H04N 5/2328 |
| 2017/0315706 A1 * | 11/2017 | Helppi ............... G08G 5/0052 |
| 2018/0033320 A1 * | 2/2018 | Castelli ............. G05D 1/0083 |
| 2019/0121156 A1 * | 4/2019 | Yu .................... H04N 5/23296 |
| 2019/0171337 A1 * | 6/2019 | Perrin ................ G08G 5/0021 |
| 2019/0204824 A1 * | 7/2019 | Micros ............... B64C 39/024 |
| 2019/0235523 A1 * | 8/2019 | Rozenberg ........... G05D 1/042 |
| 2019/0265705 A1 * | 8/2019 | Zhang ................ G05D 1/0005 |
| 2019/0392719 A1 * | 12/2019 | Parker .............. G01C 21/005 |
| 2020/0393852 A1 * | 12/2020 | Rozenberg .......... G05D 1/0676 |
| 2020/0410876 A1 * | 12/2020 | Gremmert .......... G08G 5/0047 |

\* cited by examiner

Obtaining an image including the runway and identifying a TDP in the image
302

Defining a horizontal y-axis and a vertical z-axis in the obtained image, the horizontal y-axis and the vertical z-axis intersecting through a point of the obtained image
304

Calculating the lateral distance in pixels from the horizontal y-axis of the obtained image to the identified TDP in the obtained image
(lateral deviation Δy)
306

Calculating the longitudinal distance in pixels from the vertical z-axis of the obtained image to the identified TDP in the obtained image
(longitudinal deviation Δz)
308

IMAGE SENSOR BASED AUTONOMOUS LANDING

TECHNICAL FIELD

The presently disclosed subject matter relates to systems and methods of controlling an aircraft during autonomous landing.

BACKGROUND

Unmanned aerial vehicles (UAVs), also known as, "drones", can operate with various degrees of autonomy: either under remote control by a human operator, or fully or intermittently autonomously, e.g., by on-board computers. When operating a UAV remotely, datalink latency can make manual control difficult or even dangerous during landing. Therefore, even in situations where the drone is normally operated by a human, autonomous landing can be used. Autonomous landing can also be used for landing manned aircraft to help prevent accidents resulting from human error, for example, when there are poor flying conditions.

GENERAL DESCRIPTION

In many cases autonomous landing systems rely upon a Global Positioning System (GPS) in order to provide the location of the aircraft. However, in some circumstances GPS may be unavailable, for example, due to malfunction or jamming. Therefore it is desirable to have a method and system for facilitating autonomous landing that is not dependent upon GPS.

According to one aspect of the presently disclosed subject matter there is provided a computer-implemented method of controlling an aircraft during autonomous landing. The method includes using a computer for performing the following: applying image processing on an image captured by a camera on-board the aircraft while approaching a runway for identifying in the image a touchdown point (TDP) of the runway; calculating a deviation, in image parameters, of the TDP relative to the center of the image; converting the deviation in image parameters to angular and distance deviation values based on predefined ratios; calculating an offset of the aircraft's position relative to a landing corridor ending at the identified TDP based on the calculated angular and distance deviation; and transmitting the calculated offset to an aircraft control system configured to provide instructions for controlling the aircraft; wherein the offset is used for controlling the aircraft for guiding the aircraft towards the landing corridor to enable landing.

In addition to the above features, the method according to this aspect of the presently disclosed subject matter can include one or more of features (i) to (xi) listed below, in any desired combination or permutation which is technically possible:

(i). wherein calculating a deviation in image parameters includes: defining a horizontal y-axis and a vertical z-axis in the image, the horizontal y-axis and the vertical z-axis intersecting through a point of the image; calculating the lateral deviation in pixels from the horizontal y-axis of the image to the identified TDP in the image; and calculating the longitudinal deviation in pixels from the vertical z-axis of the image to the identified TDP in the image.

(ii). wherein calculating an offset of the aircraft's position relative to a landing corridor includes: calculating the lateral offset of the aircraft relative to the landing corridor; and calculating the longitudinal offset of the aircraft relative to the landing corridor.

(iii). controlling the aircraft to guide the aircraft towards the landing corridor.

(iv). obtaining one or more aircraft parameters; and calculating the offset of the aircraft's position relative to the landing corridor also using the obtained one or more aircraft parameters.

(v). obtaining one or more camera parameters of the camera's positioning on-board the aircraft relative to an axis of the aircraft; and calculating the offset of the aircraft's position relative to the landing corridor also using the obtained one or more camera parameters.

(vi). repeating the process iteratively until the aircraft safely lands.

(vii). continuously obtaining images until a TDP is identified.

(viii). wherein identifying in the image a TDP of the runway includes: locating a runway in the image; identifying a beginning and an ending of the runway; and identifying the location of the TDP relative to the beginning and ending of the runway.

(ix). wherein the one or more air parameters comprise one or more of: an altitude of the aircraft from the ground; and an angle of the aircraft.

(x). wherein the aircraft is an unmanned aerial vehicle (UAV)

(xi). wherein the field of view (FOV) of the camera is pointing in a direction which allows capturing images of the area in front of the aircraft's nose.

According to another aspect of the presently disclosed subject matter there is provided a non-transitory program storage device readable by machine, tangibly embodying a program of instructions executable by the machine to perform the above method of operating a sensor network.

This aspect of the disclosed subject matter can optionally include one or more of features (i) to (xi) listed above, mutatis mutandis, in any desired combination or permutation which is technically possible.

According to another aspect of the presently disclosed subject matter there is provided a system mountable on an aircraft for controlling the aircraft during autonomous landing. The system includes a camera, and a processor operatively connected to the camera and configured to perform the following: obtain from the camera a captured image; identify in the image a touchdown point (TDP) of the runway; calculate a deviation in image parameters from the center of the image relative to the identified TDP; convert the deviation in image parameters to angular and distance deviation based on predefined ratios; calculate an offset of the aircraft's position relative to a landing corridor ending at the identified TDP based on the calculated angular and distance deviation; and transmit the calculated offset to an aircraft control system configured to provide instructions for controlling the aircraft; wherein the offset is used to control the aircraft during landing.

This aspect of the disclosed subject matter can optionally include one or more of features (i) to (xi) listed above, mutatis mutandis, in any desired combination or permutation which is technically possible. In addition to the above features, the system according to this aspect of the presently disclosed subject matter can include one or more of features (xii) to (xvi) listed below, in any desired combination or permutation which is technically possible:

(xii). wherein the camera is selected from a group comprising of: a panoramic camera; a mid-wavelength infrared camera; a short wavelength infrared camera; a light detection and ranging camera; and a synthetic aperture radar camera.

(xiii). wherein the flight control system is operatively connected to one or more of the group comprising of: an engine; a flight control surface; and a landing gear.

(xiv). wherein the one or more aircraft parameter sensors are selected from a group comprising of: an altitude sensor; an angles sensor; and a speed sensor.

(xv). wherein the altitude sensor is selected from a group comprising of: an altimeter; a radar altimeter; and a barometer.

(xvi). wherein the angles sensor is selected from a group comprising of: an inertial navigation system; a gyroscope; a compass; and a magnetometer.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "identifying", "calculating". "converting", "transmitting", "defining", "using", "controlling", "repeating", "locating". "generating". "determining", or the like, refer to the action(s) and/or process(es) of a computer that manipulate and/or transform data into other data, said data represented as physical, such as electronic, quantities and/or said data representing the physical objects.

The term "computer" or "processor" or variations thereof should be expansively construed to cover any kind of hardware-based electronic device comprising a processing circuitry providing data processing capabilities including, by way of non-limiting example a processing device (e.g. digital signal processor (DSP), microcontroller, field programmable circuit, application-specific integrated circuit (ASIC), etc.) or a device which comprises or is operatively connected to one or more processing devices.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
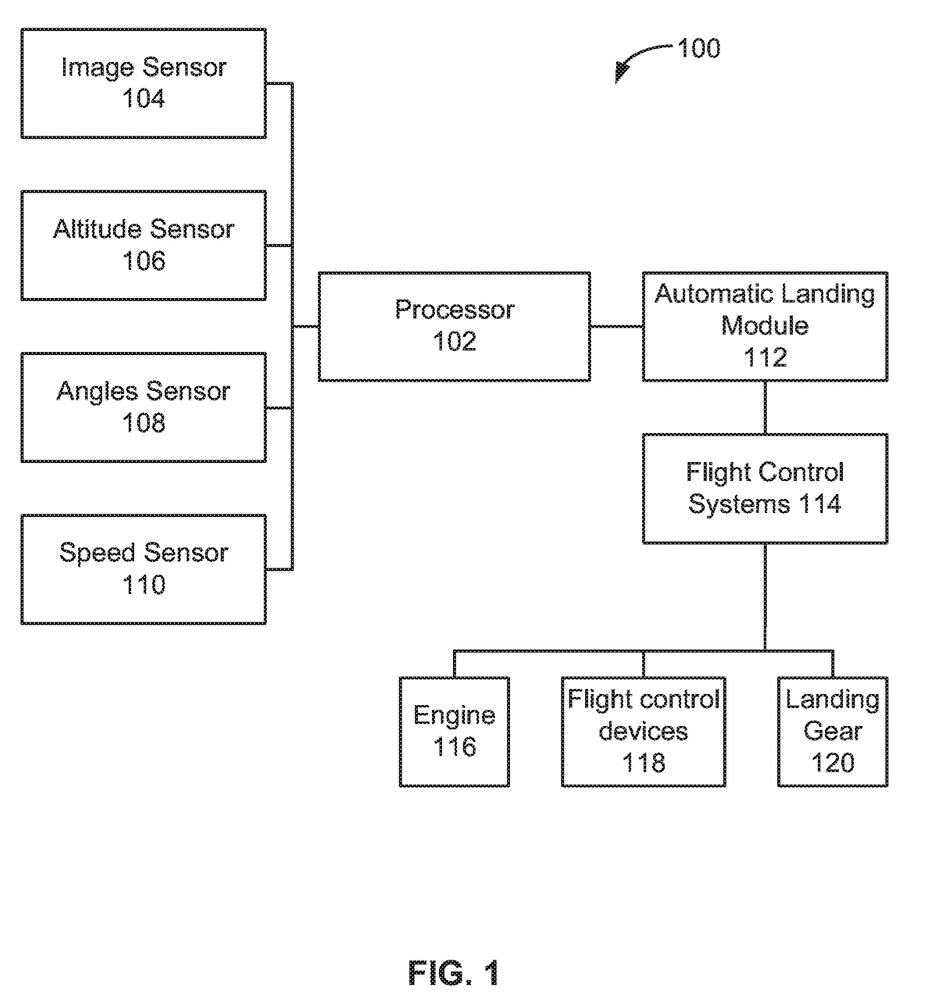
FIG. 1 illustrates a functional block diagram of a system for controlling an aircraft during autonomous landing in accordance with certain examples of the presently disclosed subject matter.

Bearing this in mind, attention is drawn to FIG. 1 illustrating an autonomous landing system 100 in accordance with certain examples of the presently disclosed subject matter. The illustrated autonomous landing system 100 includes one or more processors 102 configured to perform image processing and execute various operations as disclosed herein.

Processor 102 is operatively connected to an image sensor 104, an altitude sensor 106, an angles sensor 108, a speed sensor 110, and an automatic landing module (ALM) 112.

Image sensor 104 is located on-board an aircraft and its field of view is pointing in a direction which allows capturing images of the area in front of the aircraft's nose. Image sensor 104 can include, for example, one or more of the following cameras/sensors: panoramic [pano], infrared [IR], mid-wavelength infrared [MWIR], short-wavelength infrared [SWIR], light detection and ranging [LIDAR], synthetic aperture radar [SAR], any other appropriate multiple spectral sensing device that can be used as a sensor during the daytime and/or night-time, etc. Optionally, image sensor 104 can have different selectable modes of operation. An appropriate mode of operation of the image sensor 104 can be selected based on various real-time parameters including for example, time of day, weather, etc.

Altitude sensor 106 is configured to determine an altitude of the aircraft. Altitude sensor 106 can include, for example, one or more of the following sensors; altimeter, radar altimeter [RALT], barometer, or any other appropriate altitude sensing device.

Angles sensor 108 is configured to determine the angles of the aircraft (e.g. Euler angles, azimuth, etc.). Angles sensor 108 can include, for example, one or more of the following types of sensors: inertial navigation system [INS], gyroscope, compass, magnetometer, any other appropriate angles sensing device, etc.

Speed sensor 110 is configured to sense a speed of the aircraft. Speed sensor 110 can include, for example, pitot tubes, or any other appropriate speed sensing device.

Altitude sensor 106, angles sensor 108, and speed sensor 110 can be mounted on-board the aircraft.

ALM 112 can be located on-board the aircraft and is an aircraft control system operatively connected to flight control systems 114 of the aircraft. ALM 112 is configured to receive data (e.g. from processor 102) and control the landing of the aircraft accordingly. For example, ALM 112 can control the landing of the aircraft by generating flight commands/instructions that are used by one or more of the flight control systems 114. ALM 112 can be, for example, an automatic take-off and landing (ATOL) system.

Typical ATOL systems can provide automatic takeoff and landing utilizing Differential Global Positioning System (DGPS) and Optronic Positioning and Tracking System (OPATS) based on ground laser radar and on-board retro reflector.

In typical ATOL control loops, the UAV uses the position measurements to calculate the deviation of the UAV from the Glide Slope (GLS). The UAV uses the ATOL control loops to maintain the GLS and runway centre line. All loops commands (pitch, roll, throttle, rudders, nose wheel steering) are calculated in accordance with the UAV status in the relevant process (takeoff or landing). The longitudinal loop controls the UAV's vertical position relative to the desired GLS, the rate of descent and the attitude at touchdown. The lateral directional loops control the position relative to the runway center line and perform runway steering. The loops ensure touchdown at proper heading and bank angles. When a typical ATOL system utilizes DGPS, lateral and vertical distance deviations or "offsets" from the GLS are input to the ATOL system.

In a typical ATOL, the Optronic Positioning and Tracking System (OPATS) is a combined dual laser radar and TV camera sensor, measuring UAV dynamic positions during the takeoff or landing approach. The UAV is "lighted" by laser pulses from the laser radar. These pulses are echoed by the UAV retro reflector back to OPATS. From these echoes the OPATS determines UAV distance, azimuth, and elevation angle. This data is transferred to the UAV control System (UCS) and from the UCS to the UAV for ATOL control loops feedback. Similar functionality can be achieved with electromagnetic radar, using a ground-based transmitter and an airborne echo system.

The present invention can make use of an ATOL system, without the need of using a GPS or laser radar, by determining data from an image captured by an image sensor as described herein below.

The present invention is also not reliant upon radar transmissions that are sent from ground-based radar transmitters, and, thus does not require that such ground based radar transmitters be deployed and present at each of the landing sites.

Flight control systems 114 are operatively connected to various subsystems on-board the aircraft configured to enable maneuvering the aircraft. These subsystems can include, for example: engine 116, flight control devices 118 (e.g., ailerons, elevator, rudder, spoilers, flaps, slats, air brakes, etc.), landing gear 120, etc.

It is noted that the teachings of the presently disclosed subject matter are not bound by autonomous landing system 100 described with reference to FIG. 1. Equivalent and/or modified functionality can be consolidated or divided in another manner and can be implemented in any appropriate combination of software with firmware and/or hardware and executed on a suitable device. For example, images can be provided by other systems, including third party equipment, and processing can be done remotely from the aircraft.

Figure 2:
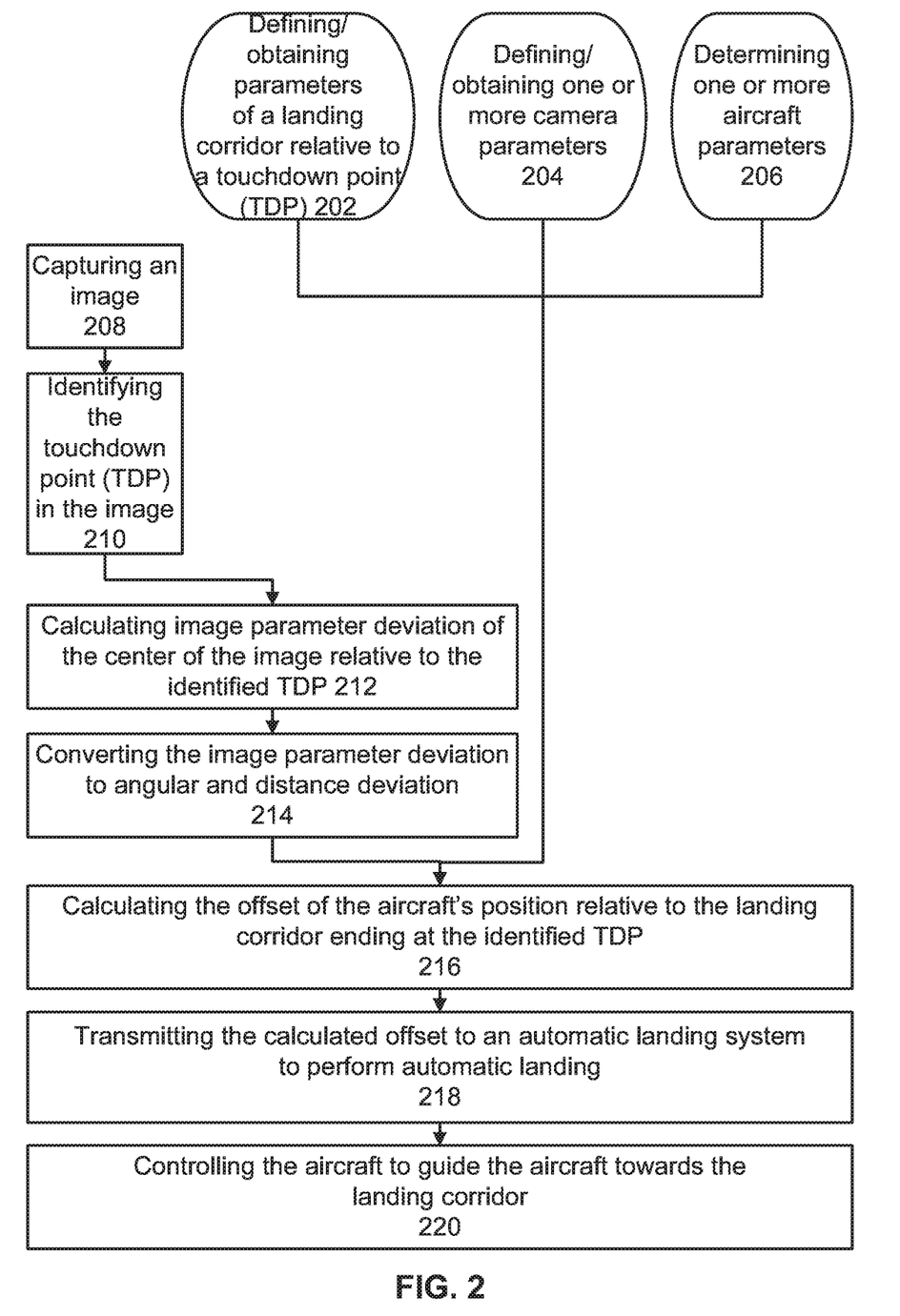
FIG. 2 illustrates a generalized flow-chart of a method for controlling an aircraft during autonomous landing in accordance with certain examples of the presently disclosed subject matter.
Figure 3:
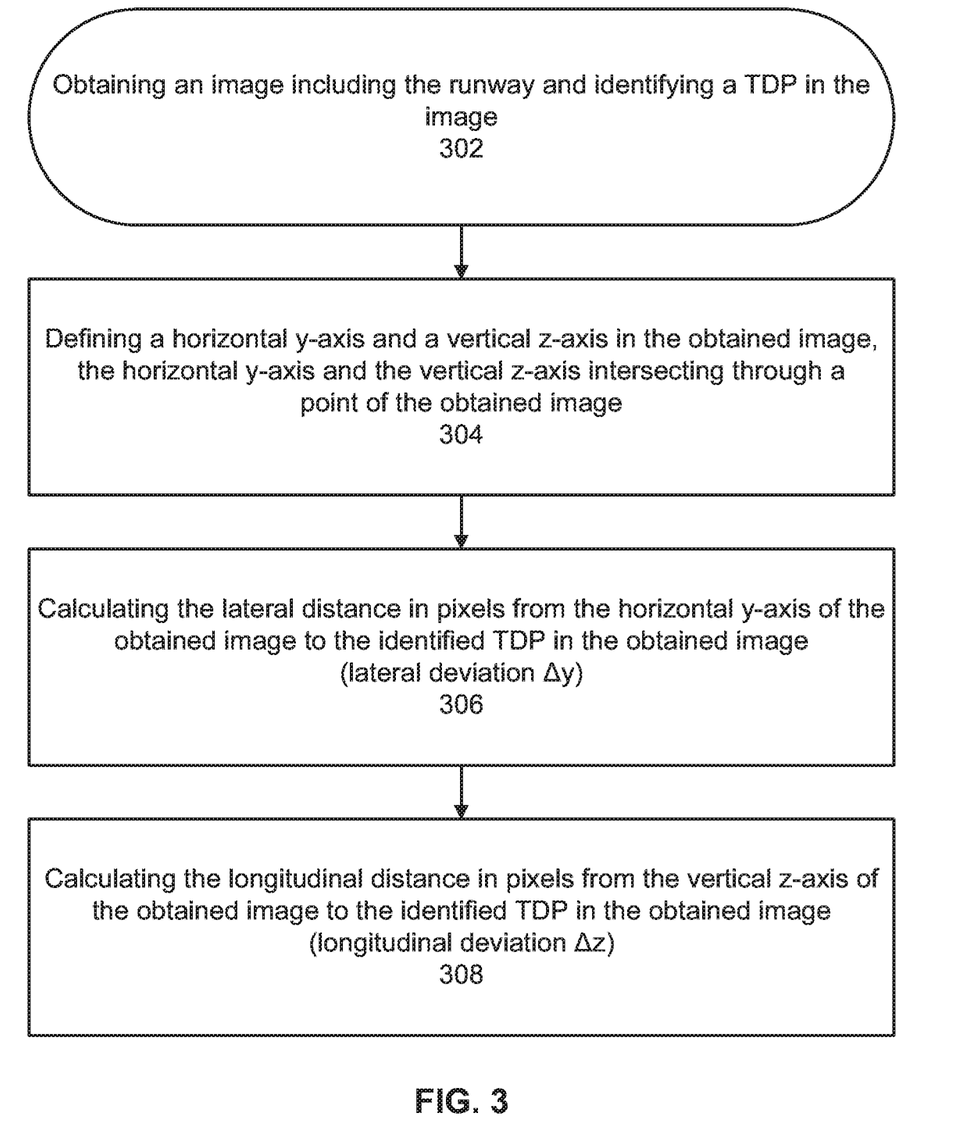
FIG. 3 illustrates a flow-chart of a method for calculating image parameter deviation in accordance with certain examples of the presently disclosed subject matter.
Figure 5:
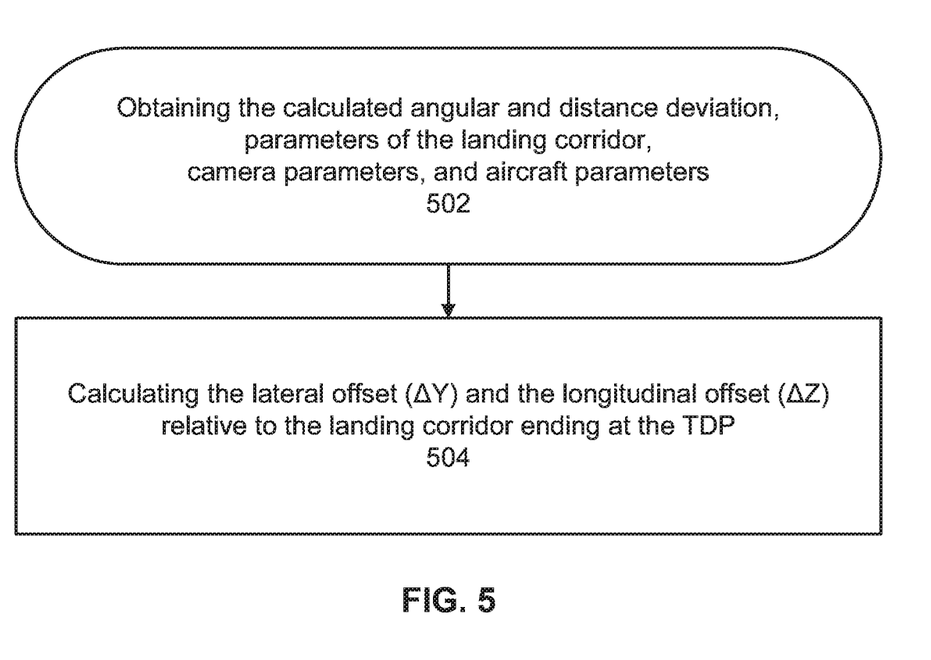
FIG. 5 illustrates a flow-chart of a method for calculating the offsets of the aircraft's position relative to a landing corridor in accordance with certain examples of the presently disclosed subject matter.

Reference is now made to FIGS. 2, 3, and 5 which show flow charts of operations in accordance with certain examples of the presently disclosed subject matter.

It is noted that the teachings of the presently disclosed subject matter are not bound by the flow charts illustrated in FIGS. 2, 3, and 5, and, the illustrated operations can occur out of the illustrated order. For example, operations 306 and 308 shown in succession can be executed substantially concurrently or in the reverse order. It is also noted that whilst the flow charts are described with reference to elements of autonomous landing system 100, this is done by way of example only and should not be construed as limiting.

FIG. 2 illustrates a generalized flow-chart of a method for controlling an aircraft during autonomous landing in accordance with certain examples of the presently disclosed subject matter.

At block 202, parameters relating to a landing corridor relative to a touchdown point (TDP) are defined and/or obtained (e.g., by processor 102). The term, "touchdown point", as used herein, refers to an area of a runway which is suitable for commencing the landing of the aircraft on the runway thereon (for example a designated area for initial touchdown of the aircraft on the runway). The location of the TDP relative to the runway can be different for different types of airborne platforms.

The term, "landing corridor", as used herein, refers to a flight path for leading the aircraft to the TDP during landing. The landing corridor provides a reference for the aircraft to use as guidance when landing. As such, the landing corridor can include various lateral, longitudinal, altitudinal, and angular parameters, defining its position and course with respect to the TDP and/or runway. The parameters of the landing corridor can be predefined and stored in a memory of the system, for obtaining by the processor when requested.

The landing corridor can comprise one or more gliding legs extending over different distances and in different angles. In one, non-limiting, example, the landing corridor can comprise a 400 meter glide path with a 1.5° incline originating at the TDP, followed by a 3 kilometer glide path with a 4° incline. In another, non-limiting, example, the TDP can be predefined as being located at the end of the first third of the runway, and the landing corridor can be defined as a glide path with a 1.5° incline from the TDP backward for 300 meters, followed by a glide path with a 4° incline for 2 kilometers.

At block 204 one or more camera parameters are defined and/or obtained (e.g., by processor 102). The camera parameters can be predefined and stored in a memory of the system, for obtaining by the processor when requested. Camera parameters include, but are not limited to, angle of view of the camera, bearing and depression angles of the camera relative to the aircraft's axes, field of view (FOV) of the camera, etc.

In some cases these camera parameters can be constant, for example, if the camera is attached to the aircraft in a fixed position (e.g., substantially straight ahead with a relatively small tilt downwards). In other cases these camera parameters need to be constantly updated based on the current position of the camera, for example, where the camera is attached to the aircraft using a rotatable support, such as a gimbal.

In some cases, even when the camera is attached at a fixed position, the field of view can be affected by a mode of operation of the camera (e.g., zoom in, or zoom out).

At block 206 one or more aircraft parameters are determined (e.g., by altitude sensor 106, angles sensor 108, speed sensor 110, etc.). Aircraft parameters include, but are not limited to, altitude of the aircraft, angular orientation of the aircraft, speed of the aircraft, etc.

Figure 6:
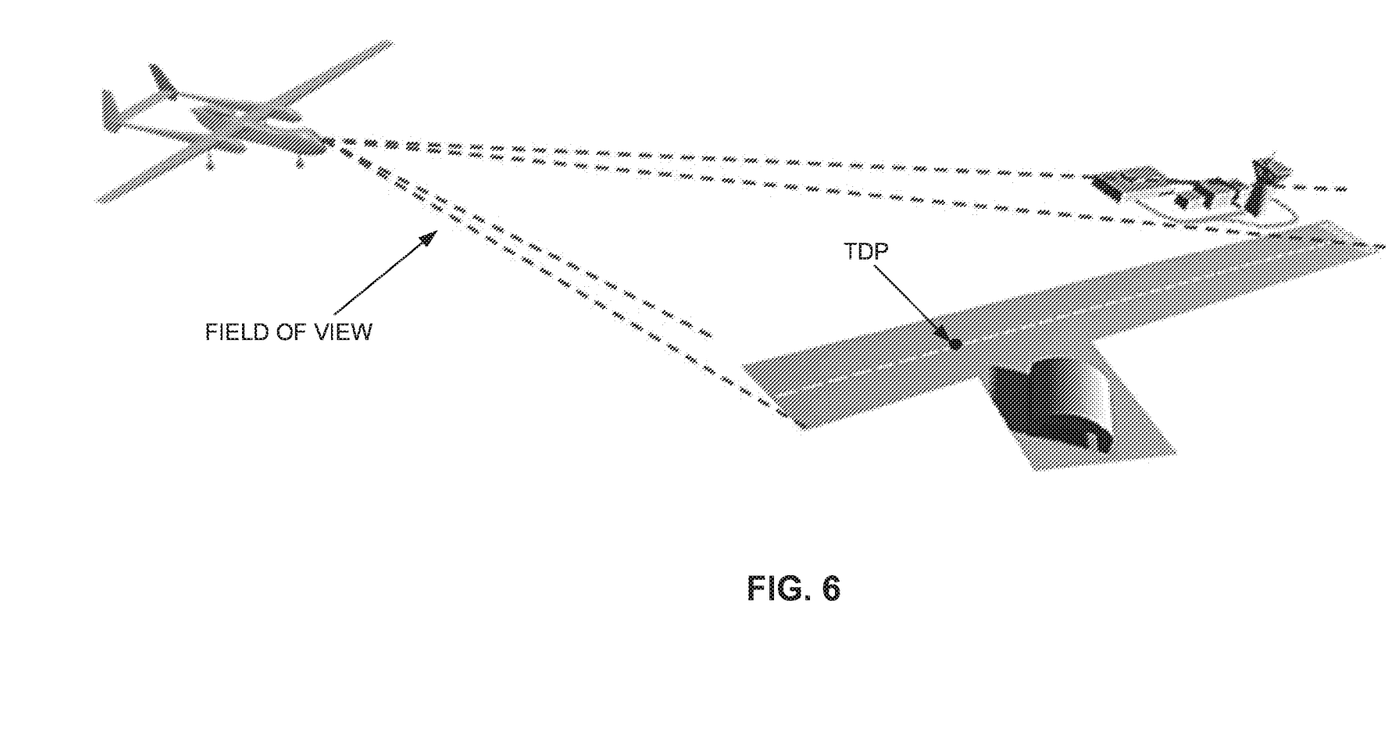
FIG. 6 illustrates schematically a field of view of an image sensor in accordance with certain examples of the presently disclosed subject matter.

At block 208 at least one image is captured (e.g., by image sensor 104), while the aircraft is approaching a runway. As mentioned above, the field of view of image sensor 104 is fixed to the aircraft with its FOV pointing in a direction which allows capturing images of the area in front of the aircraft's nose. A schematic illustration demonstrating a camera attached to an aircraft and the FOV of an image sensor is shown in FIG. 6.

Image processing is applied to the captured image to identify the TDP of the runway (block 210). Optionally, a beginning and an ending of the runway can also be identified in the captured image, and the location of the TDP can be identified relative to the location of the beginning and ending of the runway (e.g., the TDP is identified as being located at the end of the first third of the runway).

In some examples, multiple images can be captured simultaneously from multiple cameras in synchronization, each with the same and/or different angular orientation but with an, at least partially, overlapping view of the TDP, and processing can be performed on each image of the set of images in order to obtain data redundancy and thereby increase the robustness of TDP identification. Optionally, if multiple cameras are used, different cameras can be configured to have different respective spectral performance.

Once a TDP is identified in the image, image parameters of TDP-deviation from the center of the image are calculated (block 212). Image parameters can include for example, image pixels, and the TDP deviation can be defined by pixels. A more detailed example of this calculating is provided below with reference to FIGS. 3 and 4.

The calculated image parameters defining the TDP-deviation can be converted to angular and/or distance deviation (block 214). For example, image parameters can be converted based on a ratio, such as a pixel to angle ratio and/or a pixel to distance ratio (defining the value in angles of each pixel or the value in meters of each pixel in the capture image).

When converting image parameters to angular and distance deviation, the camera's FOV can be taken into account. For example, assuming that the width pixel dimension of the image is different than the height pixel dimension of the image, a first pixel to angle ratio for the horizontal axis can be determined by dividing the number of pixels across the image width by the FOV of the camera. A second pixel to angle ratio for the vertical axis can be determined by dividing the number of pixels across the image height by the FOV of the camera. After the pixel to angle ratio for each axis is determined, then the horizontal deviation of the TDP in pixels from the center of the image can be converted to horizontal angular deviation using the pixel to angle ratio determined for the horizontal axis, and, the vertical deviation of the TDP in pixels from the center of the image can be converted to vertical angular deviation using the pixel to angle ratio determined for the vertical axis. In this example, after converting the pixels to angular deviation using the FOV information, the distance deviation can be calculated using the angular deviation (e.g., also using angles of observation, and the altitude of the aircraft relative to the ground).

The above calculations are done in real-time for progressive images that are captured. Earlier values that were calculated in relation to an earlier image are different than later values that are calculated in relation to a later image, since the calculations are based on the specific characteristics of the image and the characteristics of an earlier image are different than the characteristics of a later image. The calculations for a later image are not dependent on the earlier image. Since the position of the aircraft dictates the aircraft's view of the TDP, the calculated values related to a particular image relate to the position of the aircraft when that particular image was obtained. For example, as the aircraft changes position between the time that each progressive image is captured, when a new, later image is captured the aircraft has a new, different distance from the TDP when that particular image is captured, and thus a new, different view in relation to the TDP. Thus, that newly captured later image has new characteristics which result in new calculated values that are different than the previous values that were calculated based on a previously captured, earlier image (which had a different view of the TDP).

The calculations for a particular time period are performed in relation to one particular current image or a related set of simultaneously captured current images having similar, at least partially overlapping, characteristics of a particular scene (as related to above with regard to capturing multiple images in synchronization).

At block 216 the offset of the aircraft's position relative to the landing corridor (ending at the TDP) is calculated. These calculations can be based, on various parameters including, for example: the angular and distance deviation, the camera parameters, the aircraft parameters (e.g., altitude, attitude, speed, etc.), etc. A more detailed example of this calculating is provided below with reference to FIG. 5.

The calculated offsets are transmitted to ALM 112 to enable execution of automatic landing. The calculated offsets are used for controlling the aircraft to rectify the offsets in order to fly towards the landing corridor and position the aircraft in the appropriate location for landing. For example, responsive to receiving the calculated offsets, ALM 112 generates respective instructions, calculated based on the offsets, and sends the instructions to the flight control systems 114. Flight control systems 114 in turn controls one or more of the subsystems of the aircraft (e.g. engine 116 and/or flight control surfaces 118), based on the received flight commands, in order to guide the aircraft towards the landing corridor.

The above process can be repeated in order to direct the aircraft more accurately towards the landing corridor until the aircraft can safely land on the runway.

FIG. 3 illustrates a flow-chart of a method for calculating TDP deviation in accordance with certain examples of the presently disclosed subject matter. FIG. 3 is described with reference to FIG. 4 which schematically illustrates an image 400 taken by image sensor 104 on-board the aircraft in accordance with certain examples of the presently disclosed subject matter.

Figure 4:
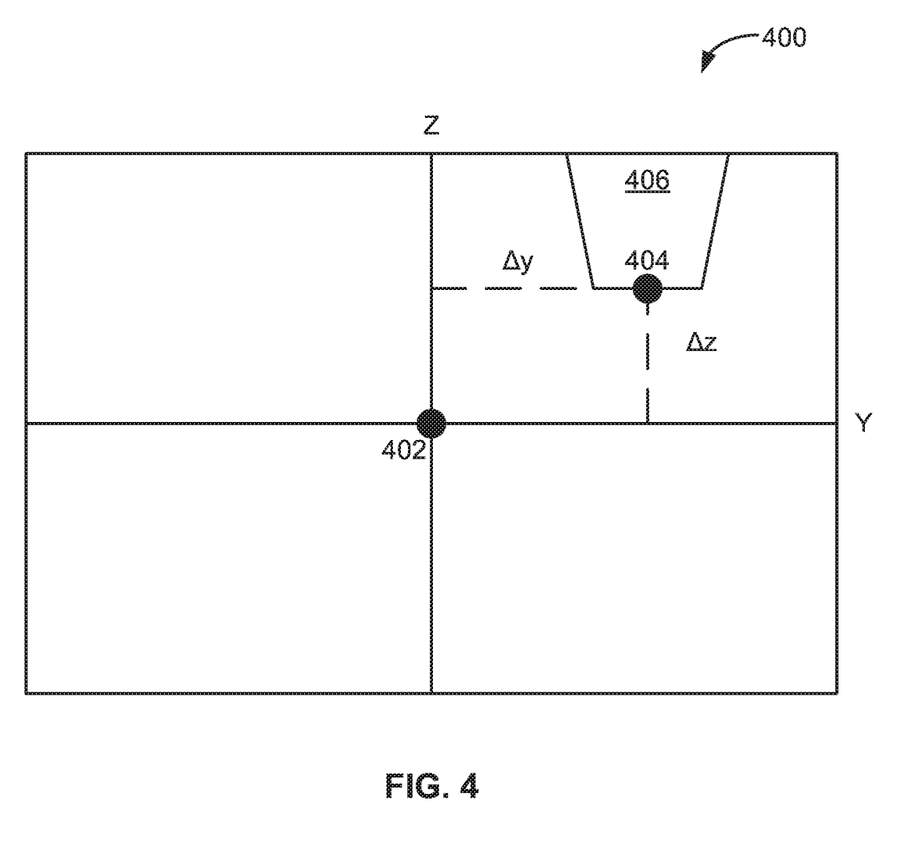
FIG. 4 illustrates schematically an image taken by a camera on-board the aircraft in accordance with certain examples of the presently disclosed subject matter.

As described above with reference to blocks (208)-(210) of FIG. 2, an image of a runway is received at the system to be processed. For example, processor 102 receives an image 400 captured by image sensor 104 located on-board the aircraft. Processor 102 (e.g. with the help of an image processing module operatively connected to the processor) can be configured to process the received image and identify a TDP 404 in runway 406.

As part of the processing of the image a horizontal axis (e.g. y-axis) and a vertical axis (e.g. z-axis) are defined in the image (block 304). The horizontal y-axis and the vertical z-axis intersect through a point of the image. For example, processor 102 can be configured to process the image and define the axes through a center point 402 in image 400.

Once the y and z axes are defined, the lateral distance of the TDP measured in pixels from the horizontal x-axis is calculated (block 306) as well as the longitudinal distance of the TDP measured in pixels from the vertical z-axis (block 308). For example, processor 102 can be configured to calculate the lateral distance in pixels $\Delta y$ from the horizontal y-axis Y and longitudinal distance in pixels $\Delta z$ from the vertical z-axis Z to the identified TDP 404, as schematically illustrated in FIG. 4.

The calculated lateral distance and vertical distance is converted from pixel values to angular and distance values to thereby obtain the offsets of the aircraft's position relative to the landing corridor ending at the identified TDP, as described above with reference to blocks (214)-(216) of FIG. 2. A more detailed example of this calculation (216) is provided below with reference to FIG. 5.

FIG. 5 illustrates a flow-chart of a method for calculating the offsets of the aircraft's position in accordance with certain examples of the presently disclosed subject matter.

As described above with reference to blocks (202)-(206) and (214) of FIG. 2, before commencing calculation of the aircraft's offset from the landing corridor, the data needed for completing the calculation is obtained (block 502). The obtained data includes, for example, the calculated angular and distance deviation, the parameters of the landing corridor, one or more camera parameters, and one or more aircraft parameters (e.g. altitude, angles, speed, etc., of the aircraft). At least part of the data can be determined by various sensors onboard the aircraft, for example, altitude sensor 106, angles sensor 108, speed sensor 110, etc.

The lateral offset ΔY and longitudinal offset ΔZ with respect to the landing corridor ending at the TDP is calculated (block 504). The lateral offset ΔY and longitudinal offset ΔZ can be calculated using the angular and distance deviation and the various other parameters. For example, these calculations can be done using the altitude of the aircraft which is compared with the altitude parameters of the landing corridor. A vector in earth axes which connects the camera location and the TDP location can be calculated using the result of this comparison along with: the Euler angles of the aircraft (obtained, for example, from the onboard INS), the bearing and depression angles of the camera, and the angular offsets that were calculated earlier. As well known in the art, the term, "vector in earth axes", relates to a vector which its axes are absolute in relation to the Earth. Using this vector and the landing corridor parameters, the lateral offset ΔY and the longitudinal offset ΔZ can be extracted. These calculations can be done regardless of the wind effect, since these calculations take into account the aircraft Euler angles (including heading), the camera angular position relative to the aircraft, and the angular deviation between the center of the image and the location of the TDP in the image. Meaning, since the angular attitude of the aircraft is determined, the angular attitude of the image sensor is used to calculate the line of sight (LOS) vector in earth axes, and the aircraft location is calculated using the FOV and conversions mentioned above for calculating the distance deviations and delivering them to aircraft control system (e.g. ATOL system). Thus, these calculations are not affected by the slide angle of the heading of the aircraft from the ground vector direction, which can be created by the wind.

As mentioned above, the aircraft location relative to the TDP is calculated. Then, using the parameters of the landing corridor, the distance deviation of the aircraft from the landing corridor can be calculated.

Once the offsets have been calculated, the offsets can be used for guiding the aircraft towards the landing corridor to allow safe landing, as described above with reference to blocks (218)-(220) of FIG. 2. For example, processor 102 can be configured to transmit the offsets to ALM 112, and ALM 112 can be configured in turn to generate instructions directed for controlling flight subsystems to enable guiding the aircraft towards the landing corridor.

It is to be understood that the invention is not limited in its application to the details set forth in the description contained herein or illustrated in the drawings. The invention is capable of other examples and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computer-implemented method of controlling an aircraft during autonomous landing, the computer-implemented method comprising:
using a computer for performing the following:
applying image processing on an image captured by a camera on-board the aircraft while approaching a runway for identifying in the image a touchdown point (TDP) of the runway;
calculating a deviation, in image parameters, of the TDP relative to a center of the image, the calculating comprising;
defining a horizontal y-axis and a vertical z-axis in the image, the horizontal y-axis and the vertical z-axis intersecting through a point of the image,
calculating a lateral deviation in pixels from the horizontal y-axis of the image to the identified TDP in the image, and
calculating a longitudinal deviation in pixels from the vertical z-axis of the image to the identified TDP in the image,
converting the deviation in image parameters to angular and distance deviation values based on predefined ratios;
obtaining parameters of a landing corridor ending at the identified TDP, camera parameters and one or more aircraft parameters, wherein the one or more aircraft parameters comprise at least one of an altitude of the aircraft, an attitude of the aircraft, and a speed of the aircraft,
wherein the landing corridor comprises a plurality of gliding legs extending over different distances and in different angles;
calculating an offset of the aircraft's position relative to a landing corridor ending at the identified TDP based on the calculated angular and distance deviation, the parameters of the landing corridor, the camera parameters and the one or more aircraft parameters and
transmitting the calculated offset to an aircraft control system configured to provide instructions for controlling the aircraft;

wherein the offset is used for controlling the aircraft for guiding the aircraft towards the landing corridor to enable landing.

2. The computer-implemented method of claim 1, wherein calculating an offset of the aircraft's position relative to a landing corridor includes:
calculating the lateral offset of the aircraft relative to the landing corridor; and
calculating a longitudinal offset of the aircraft relative to the landing corridor.

3. The computer-implemented method of claim 1, further comprising:
controlling the aircraft towards the landing corridor.

4. The computer-implemented method of claim 1, wherein the one or more camera parameters comprise:
one or more camera parameters of the camera's positioning on-board the aircraft relative to an axis of the aircraft.

5. The computer-implemented method of claim 1, further comprising:
repeating the process iteratively until safe landing of the aircraft.

6. The computer-implemented method of claim 1, further comprising:
continuously obtaining images until a TDP is identified.

7. The computer-implemented method of claim 1, wherein identifying in the image a TDP of the runway includes:
locating a runway in the image;
identifying a beginning and an ending of the runway; and
identifying the location of the TDP relative to the beginning and ending of the runway.

8. The computer-implemented method of claim 1, wherein field of view (FOV) of the camera is pointing in a direction which allows capturing images of an area in front of the aircraft's nose.

9. A system mountable on an aircraft for controlling the aircraft during autonomous landing, the system comprising:
a camera; and
a processor operatively connected to the camera and configured to perform the following:
while approaching a runway, obtain from the camera a captured image;
identify in the image a touchdown point (TDP) of the runway;
calculate a deviation in image parameters from a center of the image relative to the identified TDP, the calculation comprising:
defining a horizontal y-axis and a vertical z-axis in the image, the horizontal y-axis and the vertical z-axis intersecting through a point of the image,
calculating the lateral deviation in pixels from the horizontal y-axis of the image to the identified TDP in the image, and
calculating a longitudinal deviation in pixels from the vertical z-axis of the image to the identified TDP in the image,
converting the deviation in image parameters to angular and distance deviation based on predefined ratios;
obtain parameters of a landing corridor ending at the identified TDP, camera parameters and one or more aircraft parameters, wherein the one or more aircraft parameters comprise at least one of an altitude of the aircraft, an attitude of the aircraft, and a speed of the aircraft,
wherein the landing corridor comprises a plurality of gliding legs extending over different distances and in different angles;
calculate an offset of the aircraft's position relative to a landing corridor ending at the identified TDP based on the calculated angular and distance deviation, the parameters of the landing corridor, the camera parameters and the aircraft parameters; and
transmit the calculated offset to an aircraft control system configured to provide instructions for controlling the aircraft; wherein the offset is used to control the aircraft during landing.

10. The system of claim 9, wherein the processor is further configured to:
calculate the lateral offset of the aircraft relative to the landing corridor; and
calculate the longitudinal offset of the aircraft relative to the landing corridor.

11. The system of claim 9, further comprising:
a flight control system for controlling the aircraft to guide the aircraft towards the landing corridor based on one or more commands from the aircraft control system.

12. The system of claim 11, wherein the flight control system is operatively connected to one or more of an engine; a flight control surface; or a landing gear.

13. The system of claim 9, wherein the
one or more camera parameters comprise one or more camera parameters of the camera's positioning on-board the aircraft relative to an axis of the aircraft.

14. The system of claim 9, wherein the processor is further configured to:
repeat the process iteratively until the aircraft safely lands.

15. The system of claim 9, wherein the system is further configured to:
continuously capture images until a TDP is identified.

16. The system of claim 9, wherein the processor is further configured to:
locate a runway in the image;
identify a beginning and an ending of the runway; and
identify the location of the TDP relative to the beginning and ending of the runway.

17. The system of claim 9, wherein the camera includes at least one of: a panoramic camera; a mid-wavelength infrared camera; a short-wavelength infrared camera; a light detection and ranging camera; or a synthetic aperture radar camera.

18. The system of claim 9, further comprising one or more aircraft parameter sensors including at least one of: an altitude sensor; an angles sensor; or a speed sensor.

19. The system of claim 9, wherein the aircraft is an unmanned aerial vehicle (UAV).

20. The system of claim 9, wherein the field of view (FOV) of the camera is pointing in a direction which allows capturing images of the area in front of the aircraft's nose.

21. A non-transitory program storage device readable by machine, tangibly embodying a program of instructions executable by the machine to perform a method of controlling an aircraft during autonomous landing, the method comprising:
applying image processing on an image captured by a camera on-board the aircraft while approaching a runway for identifying in the image a touchdown point (TDP) of the runway;
calculating a deviation, in image parameters, of the TDP relative to a center of the image, the calculating comprising:

defining a horizontal y-axis and a vertical z-axis in the image, the horizontal y-axis and the vertical z-axis intersecting through a point of the image, calculating a lateral deviation in pixels from the horizontal y-axis of the image to the identified TDP in the image, and calculating a longitudinal deviation in pixels from the vertical z-axis of the image to the identified TDP in the image, converting the deviation in image parameters to angular and distance deviation values based on predefined ratios;

obtaining parameters of a landing corridor ending at the identified TDP, camera parameters and one or more aircraft parameters, wherein the one or more aircraft parameters comprise at least one of an altitude of the aircraft, an attitude of the aircraft, and a speed of the aircraft, wherein the landing corridor comprises a plurality of gliding legs extending over different distances and in different angles;

calculating an offset of the aircraft's position relative to a landing corridor ending at the identified TDP based on the calculated angular and distance deviation, the parameters of the landing corridor, the camera parameters and the one or more aircraft parameters and transmitting the calculated offset to an aircraft control system configured to provide instructions for controlling the aircraft;

wherein the offset is used for controlling the aircraft for guiding the aircraft towards the landing corridor to enable landing.

\* \* \* \* \*